No. 657,041. Patented Aug. 28, 1900.
R. H. ST. JOHN.
TYPE BAR MACHINE.
(Application filed May 24, 1899.)

(No Model.) 16 Sheets—Sheet 1.

ATTEST
R. B. Moser
H. E. Madra

INVENTOR.
ROSWELL H. ST JOHN
By W. F. Fisher
ATTY

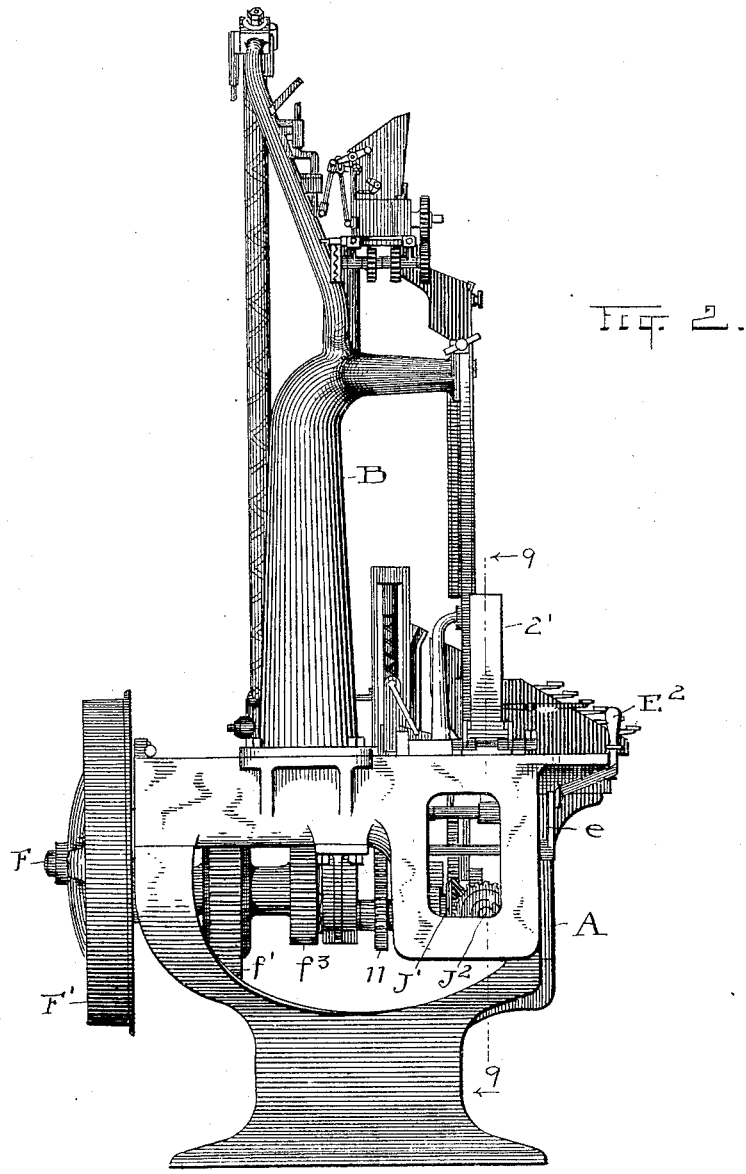

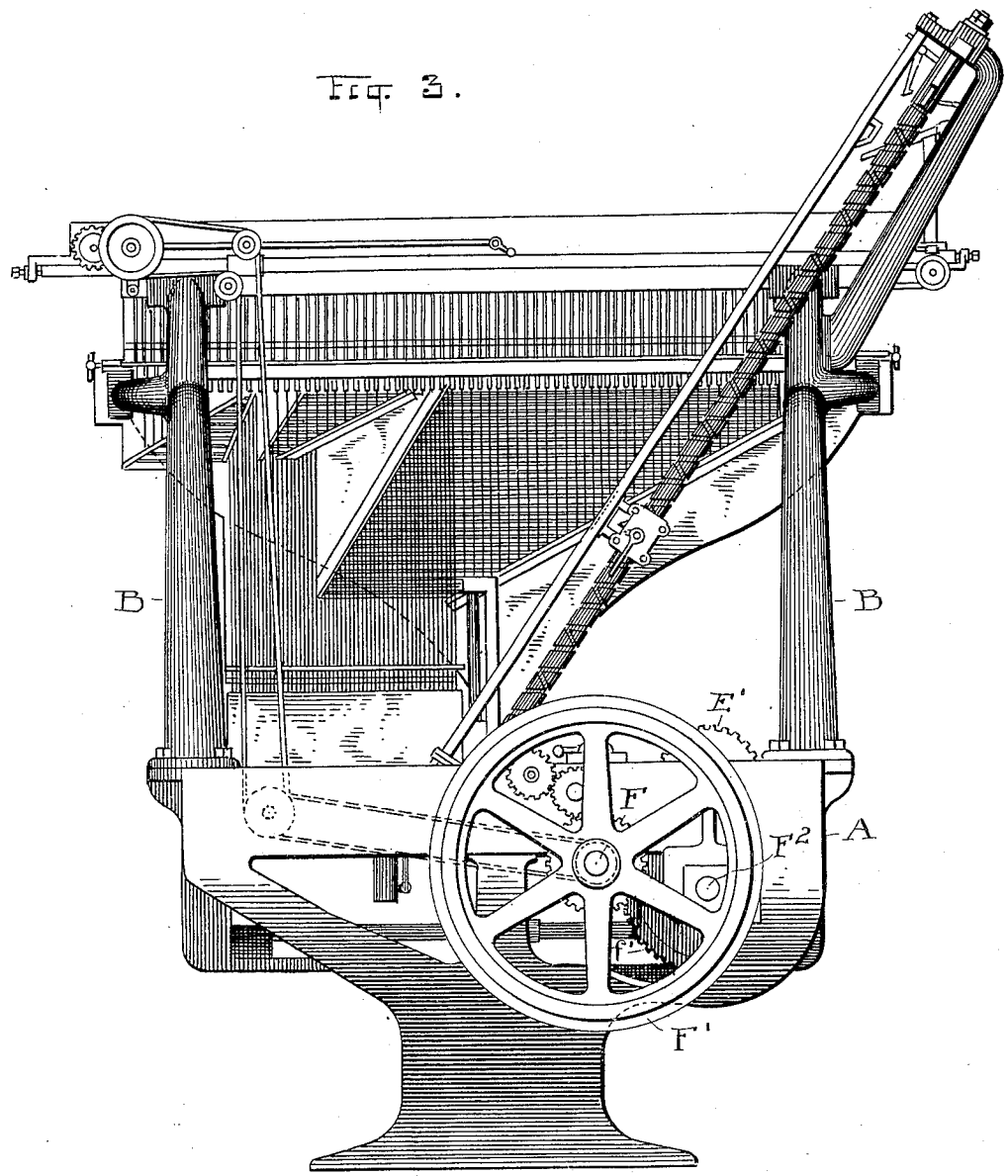

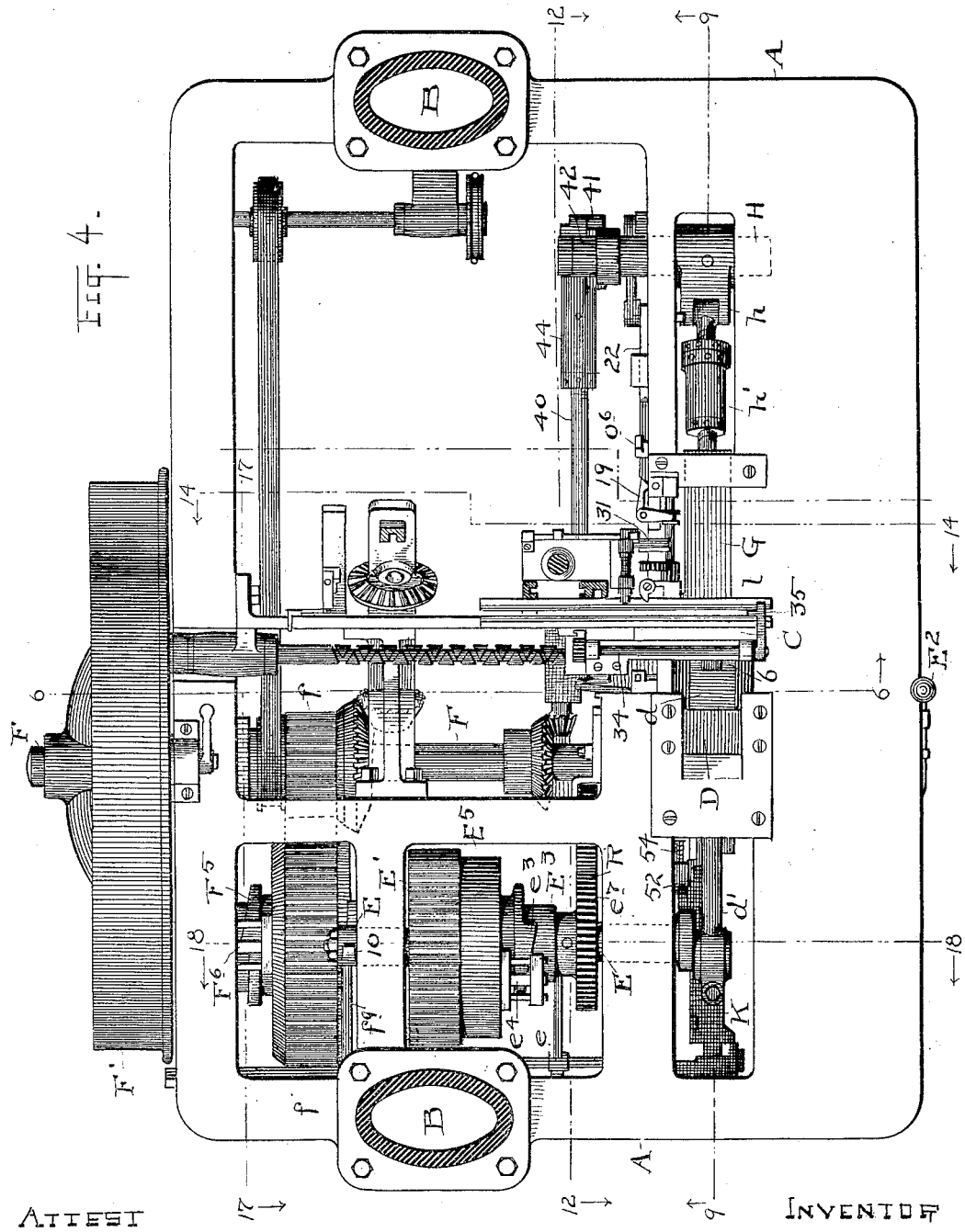

No. 657,041. Patented Aug. 28, 1900.
R. H. ST. JOHN.
TYPE BAR MACHINE.
(Application filed May 24, 1899.)
(No Model.) 16 Sheets—Sheet 5.
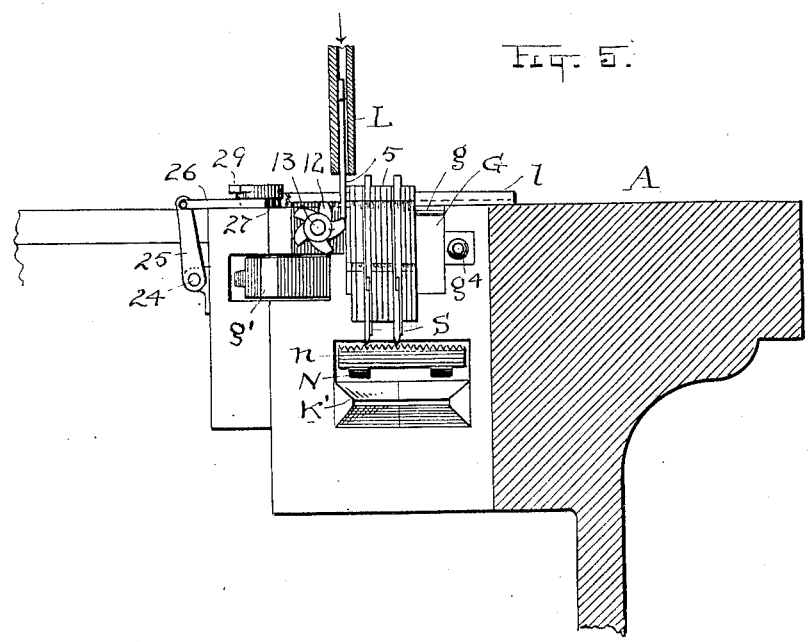
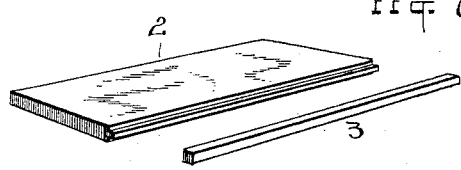
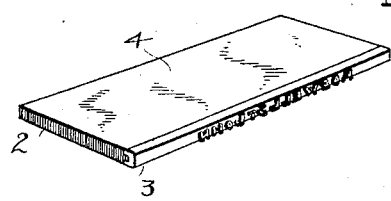
ATTEST
INVENTOR.
ROSWELL H ST JOHN.
BY H. F. Fisher
ATTY

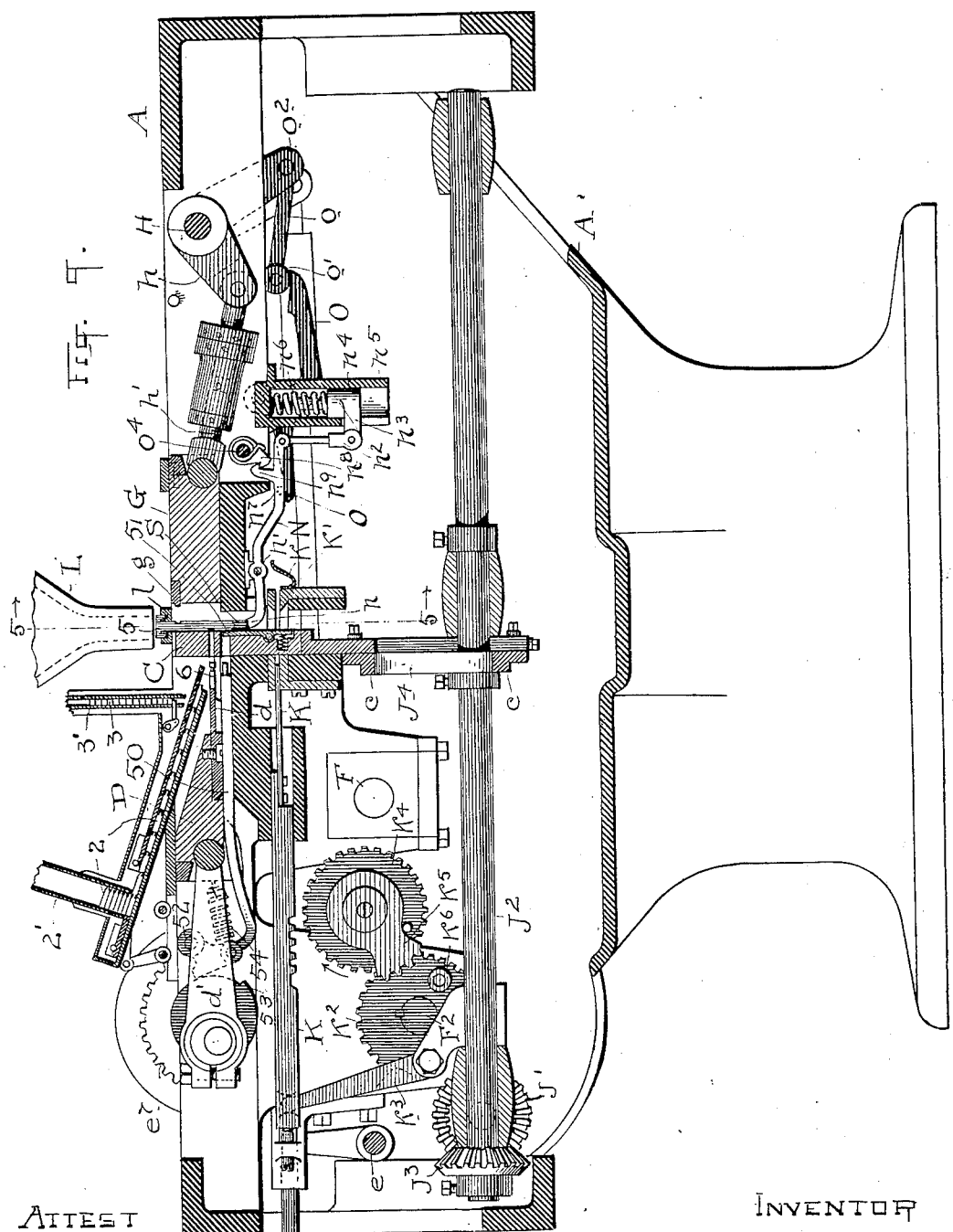

No. 657,041. Patented Aug. 28, 1900.
R. H. ST. JOHN.
TYPE BAR MACHINE.
(Application filed May 24, 1899.)
(No Model.) 16 Sheets—Sheet 7.
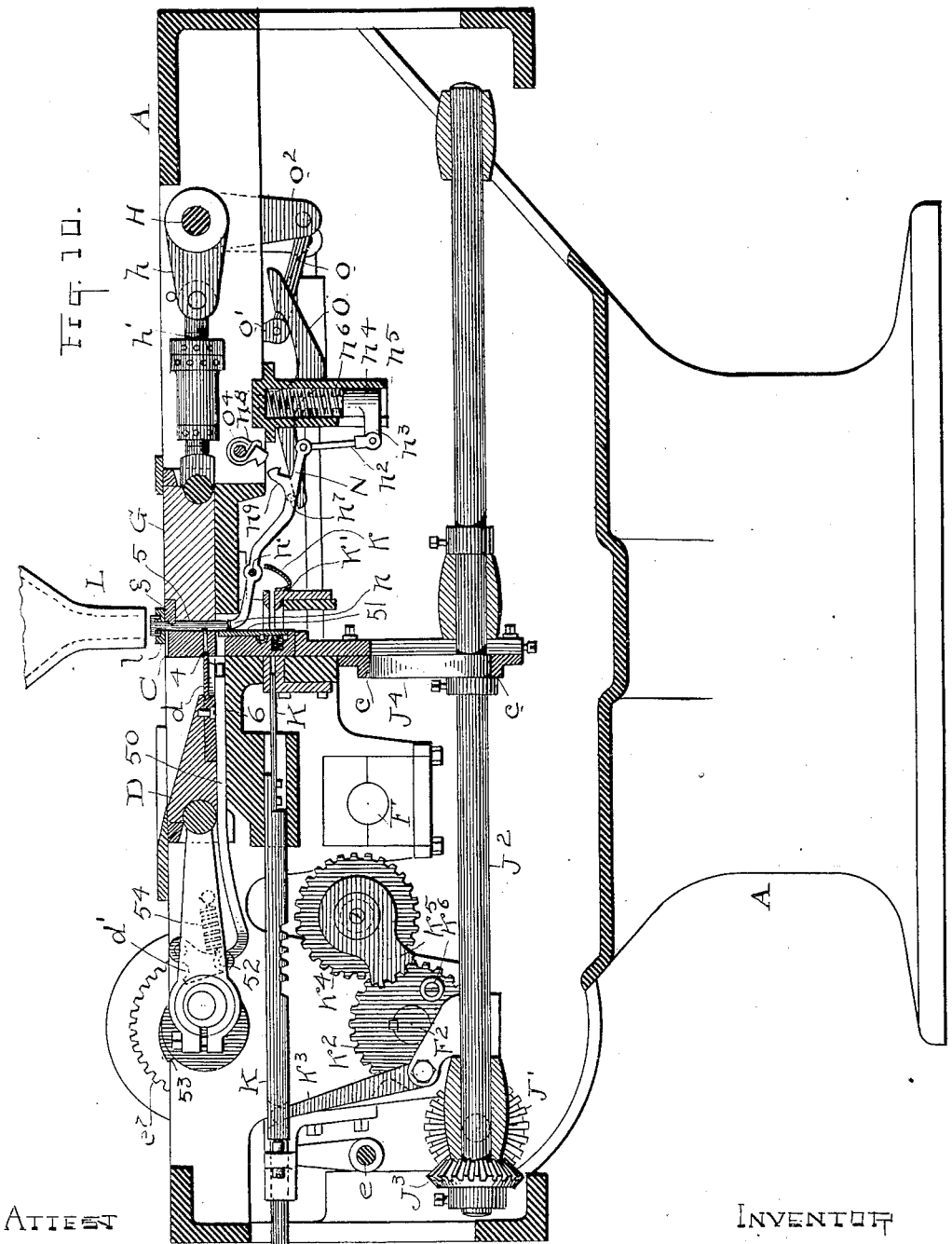
INVENTOR
ROSWELL H. ST. JOHN

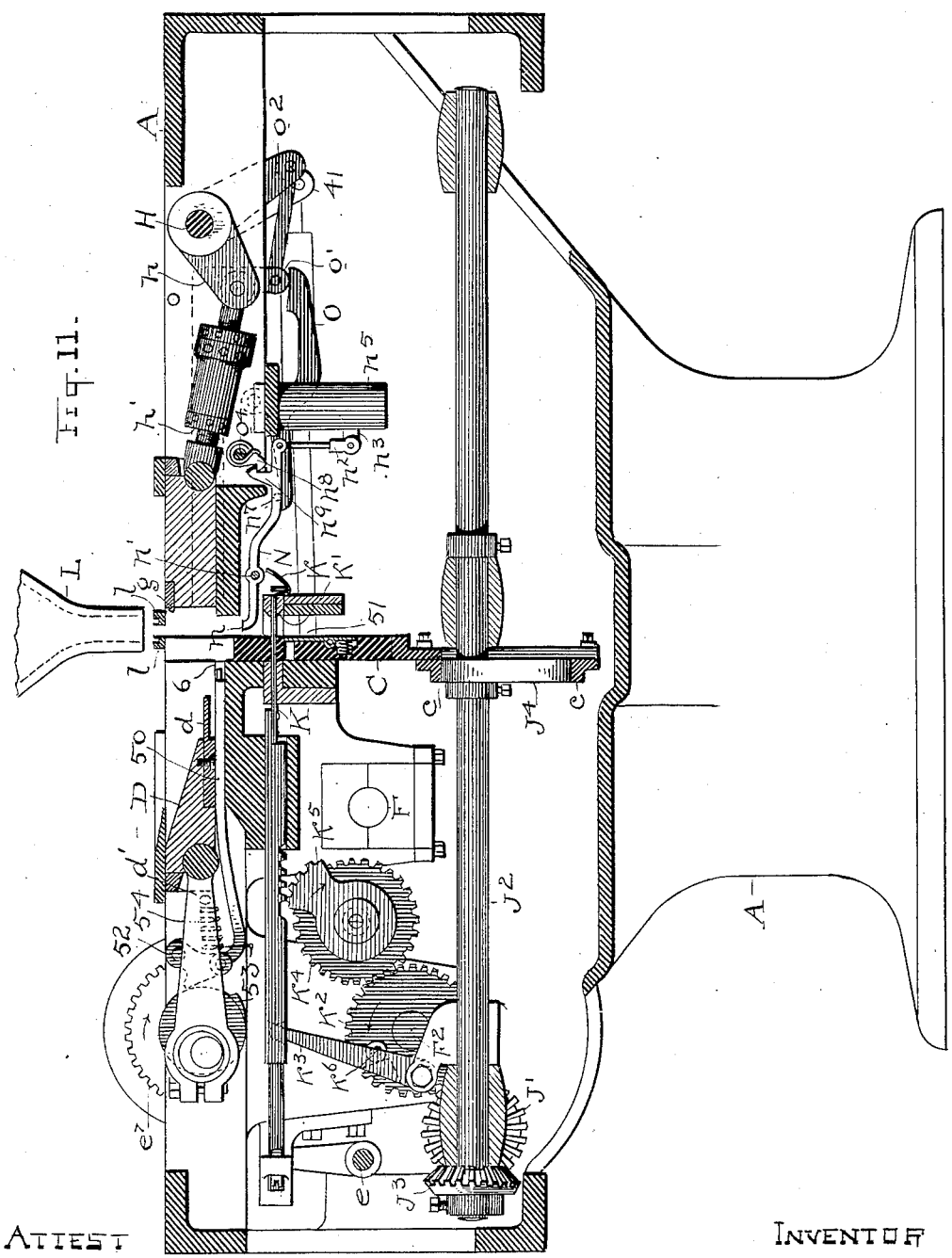

No. 657,041. Patented Aug. 28, 1900.
R. H. ST. JOHN.
TYPE BAR MACHINE.
(Application filed May 24, 1899.)
(No Model.) 16 Sheets—Sheet 9.
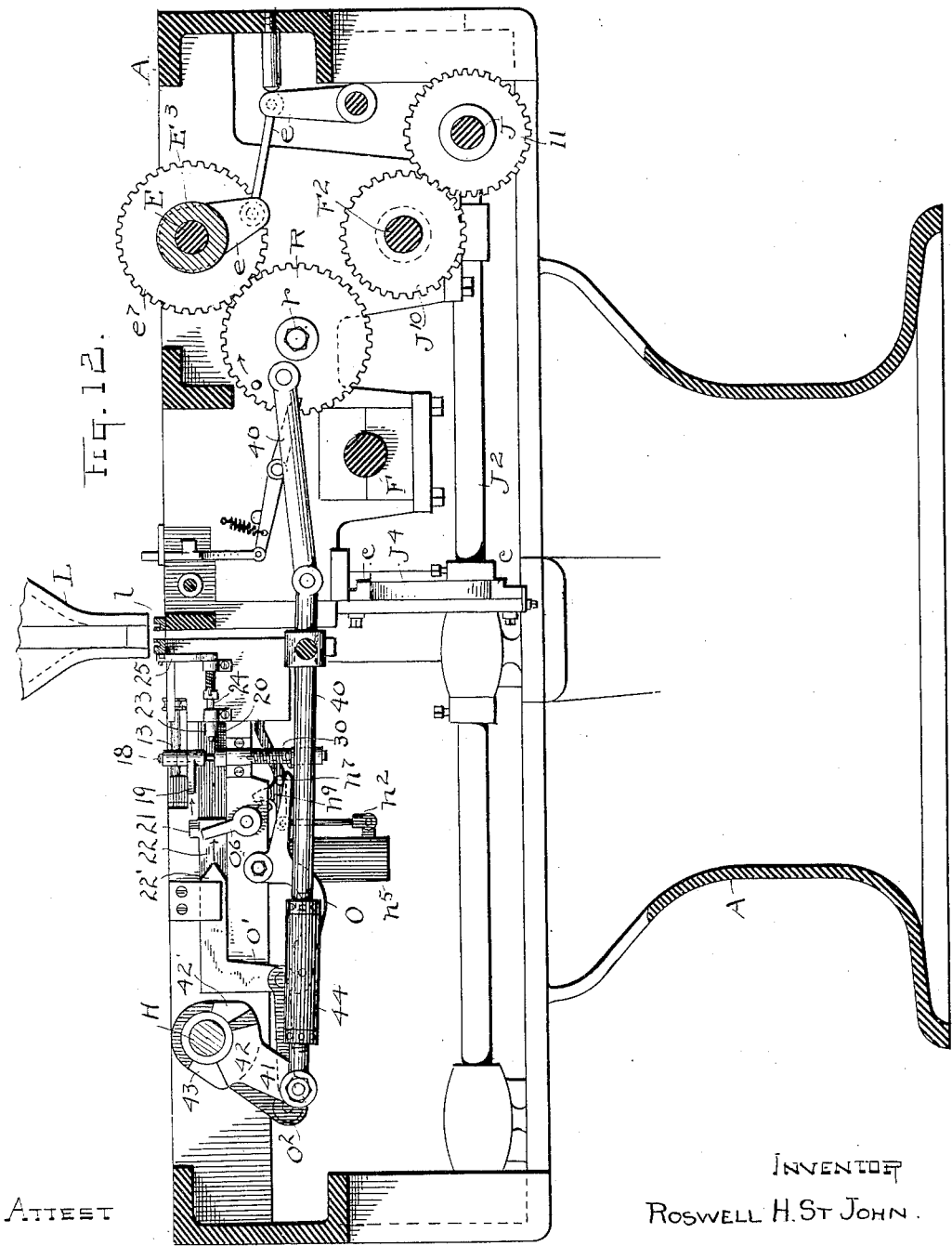
INVENTOR
ROSWELL H. ST JOHN.
By W. V. Fisher
ATTY No. 657,041. Patented Aug. 28, 1900.
R. H. ST. JOHN.
TYPE BAR MACHINE.
(Application filed May 24, 1899.)
(No Model.) 16 Sheets—Sheet 10.
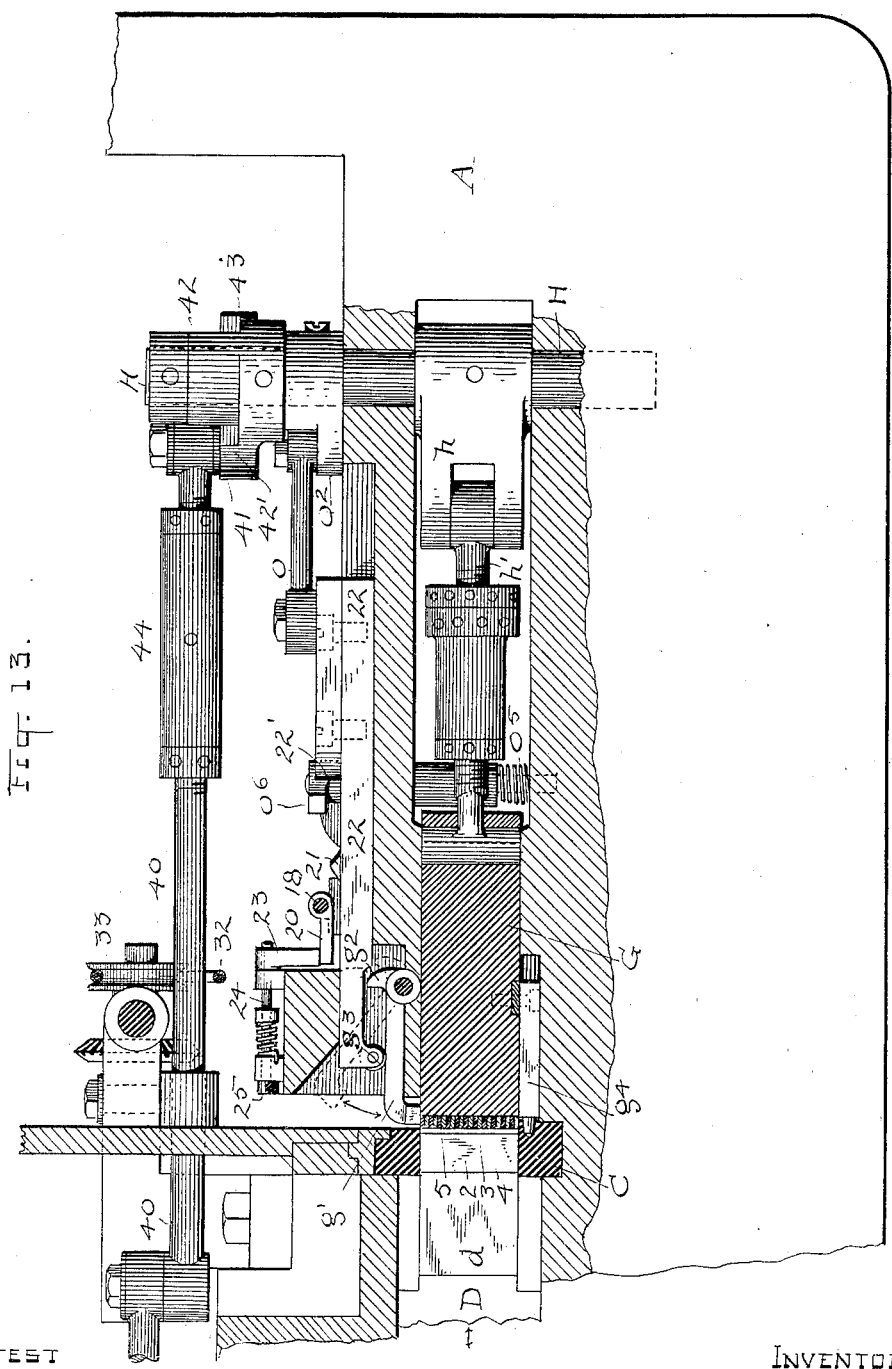
ATTEST
INVENTOR
ROSWELL H ST JOHN
BY
H. F. Fisher
ATTY No. 657,041. Patented Aug. 28. 1900.
R. H. ST. JOHN.
TYPE BAR MACHINE.
(Application filed May 24, 1899.)

(No Model.) 16 Sheets—Sheet 11.

ATTEST INVENTOR.
ROSWELL H. ST JOHN.
BY
H. F. Fisher
ATTY

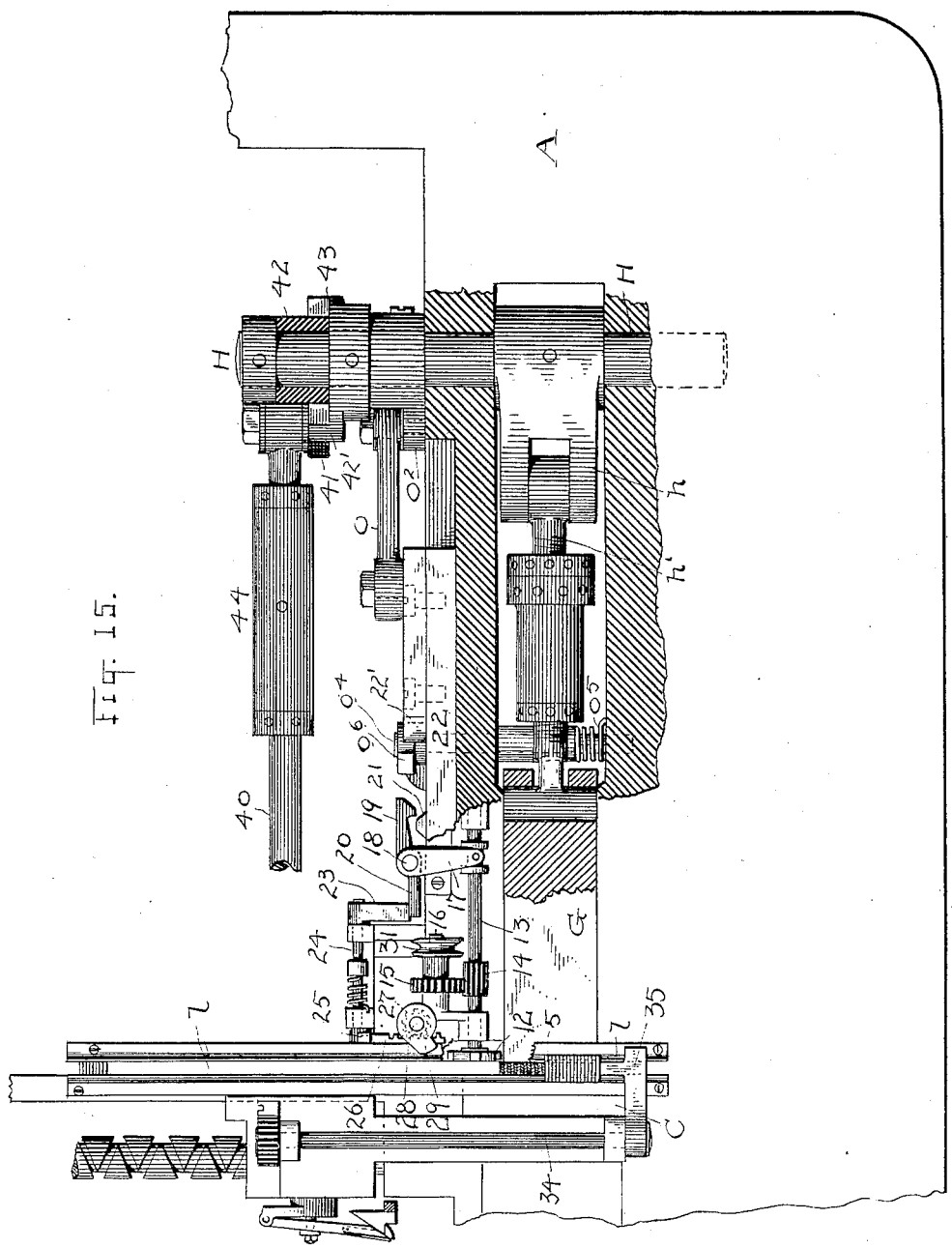

No. 657,041. Patented Aug. 28, 1900.
R. H. ST. JOHN.
TYPE BAR MACHINE.
(Application filed May 24, 1899.)

(No Model.) 16 Sheets—Sheet 13.

Attest
Inventor
Roswell H. St John.
By H. F. Fisher
Atty

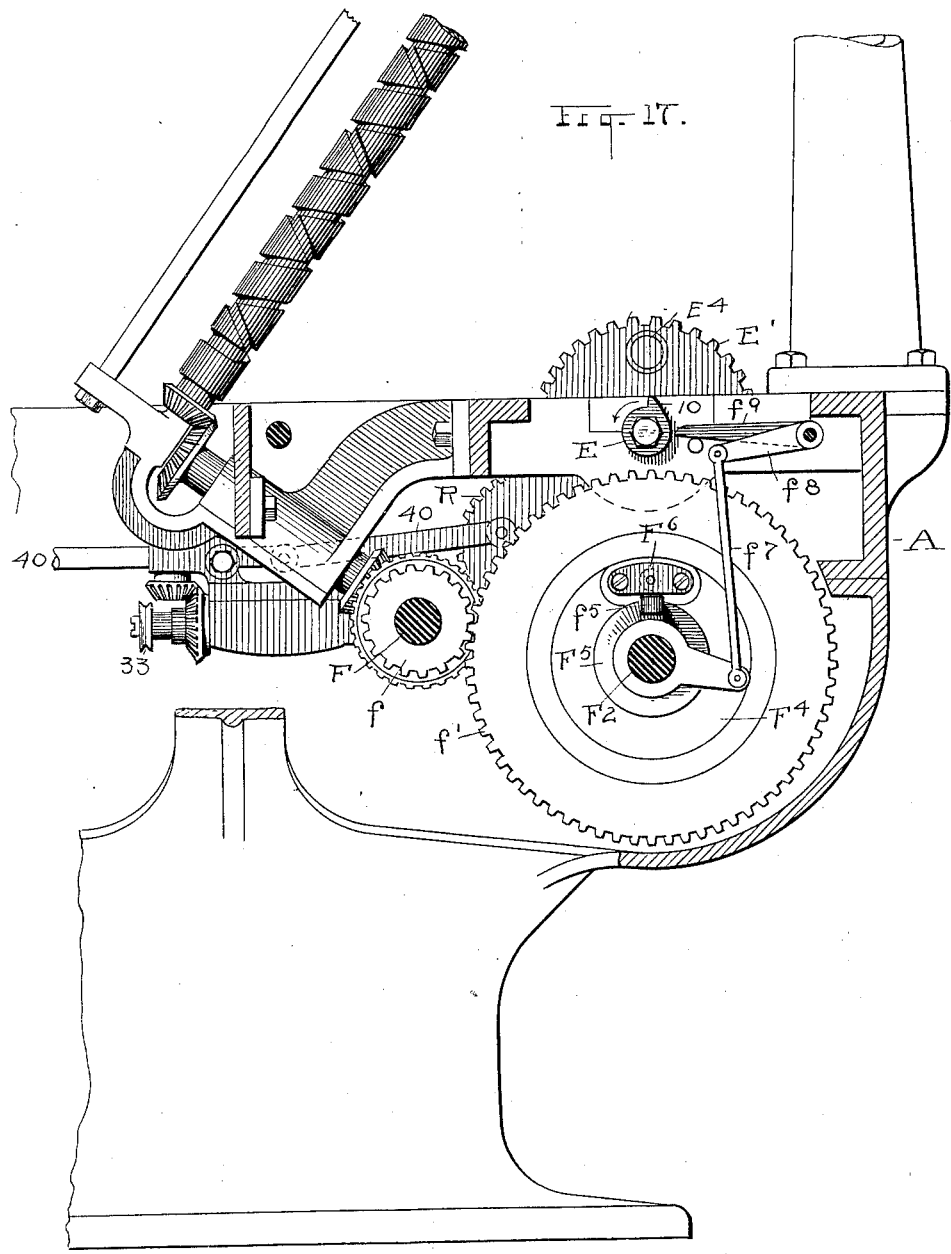

No. 657,041. Patented Aug. 28, 1900.
R. H. ST. JOHN.
TYPE BAR MACHINE.
(Application filed May 24, 1899.)

(No Model.) 16 Sheets—Sheet 15.

ATTEST

INVENTOR.
ROSWELL H. ST JOHN
BY
W. V. Fisher
ATTY

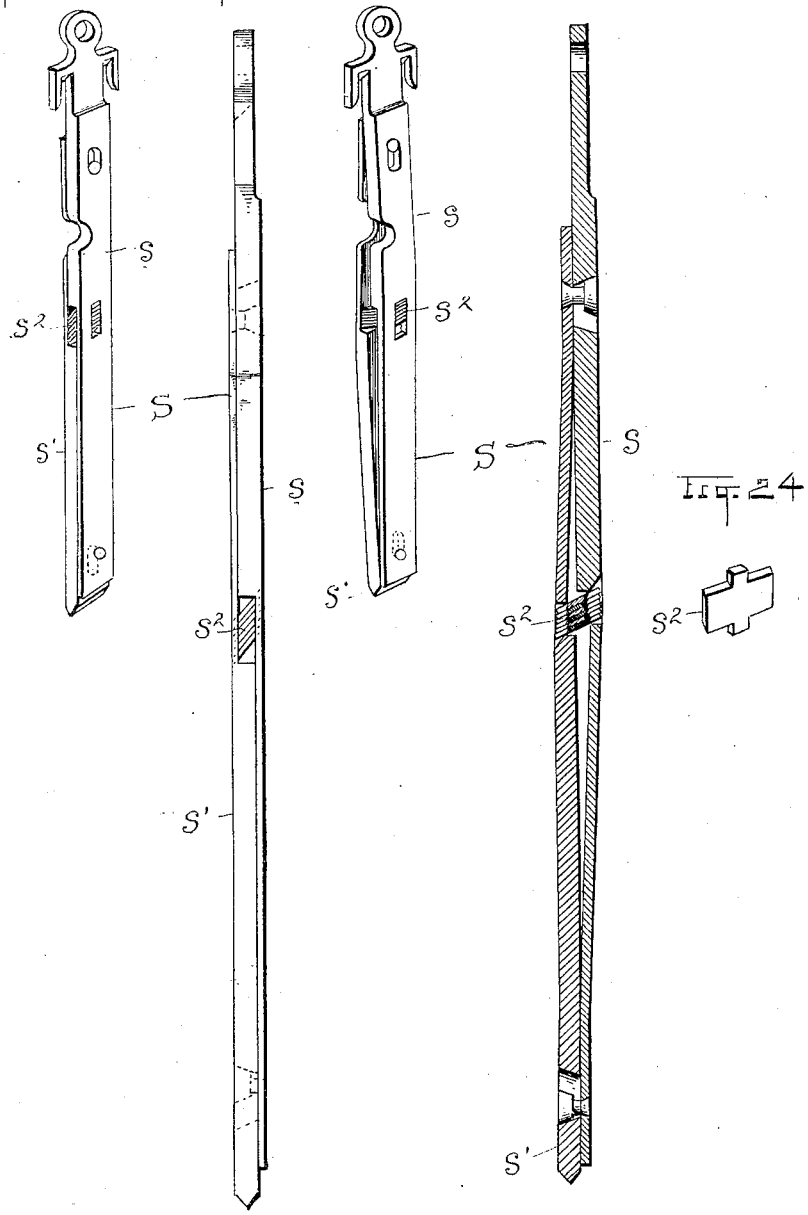

UNITED STATES PATENT OFFICE.

ROSWELL H. ST. JOHN, OF CLEVELAND, OHIO, ASSIGNOR TO JOSEPH J. LITTLE, EDWARD D. APPLETON, AND HOMER EATON, TRUSTEES, OF NEW YORK, N. Y.

TYPE-BAR MACHINE.

SPECIFICATION forming part of Letters Patent No. 657,041, dated August 28, 1900.

Application filed May 24, 1899. Serial No. 718,085. (No model.)

*To all whom it may concern:*

Be it known that I, ROSWELL H. ST. JOHN, a citizen of the United States, residing at Cleveland, in the county of Cuyahoga and State of Ohio, have invented certain new and useful Improvements in Type-Bar Machines; and I do declare that the following is a full, clear, and exact description of the invention, which will enable others skilled in the art to which it appertains to make and use the same.

My invention relates to type-bar machines of the kind particularly which are of my invention and in which a cold process of producing the bar is employed, all substantially as shown and described, and particularly pointed out in the claims.

Figure 1:
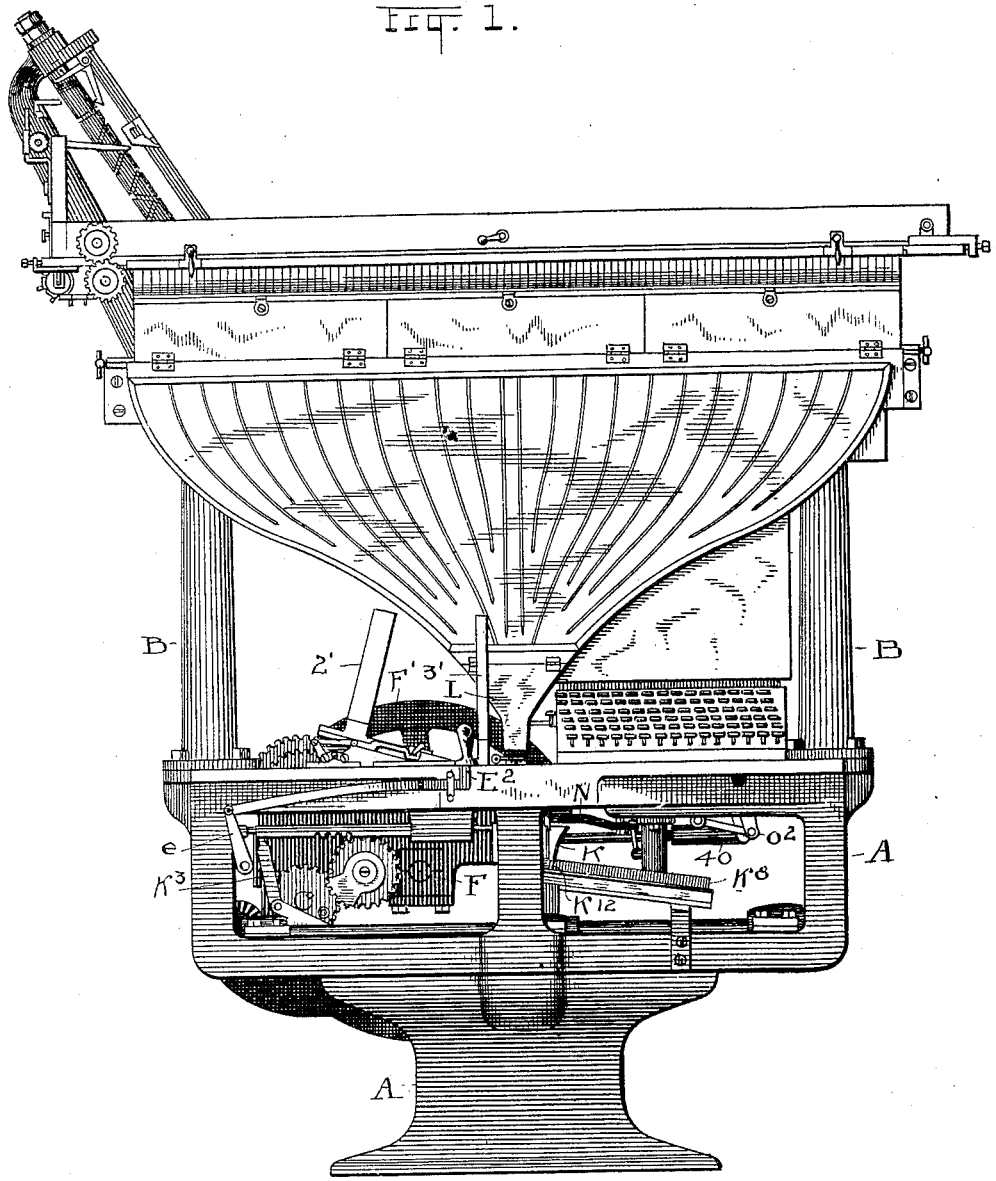
Figure 14:
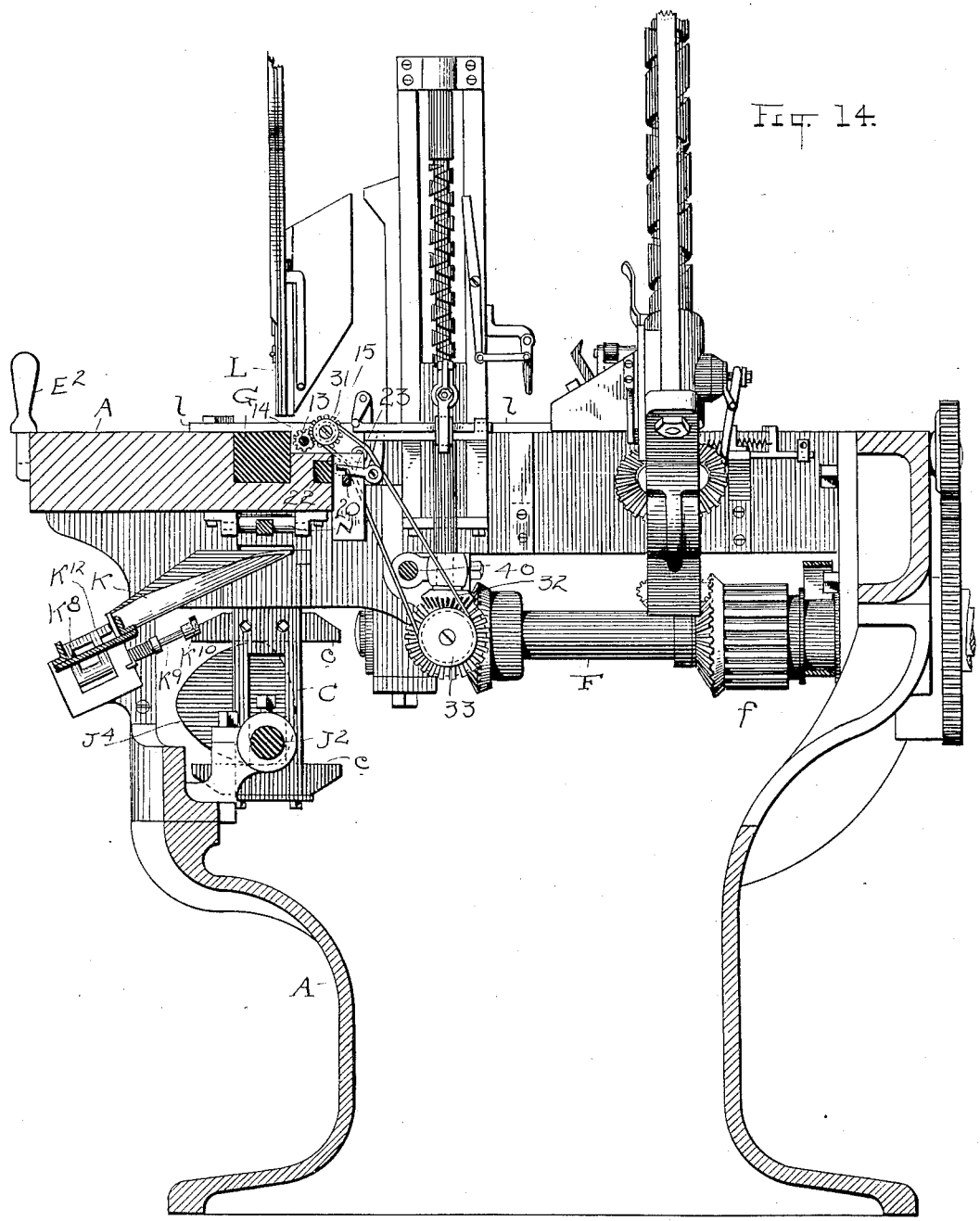
Figure 1B:
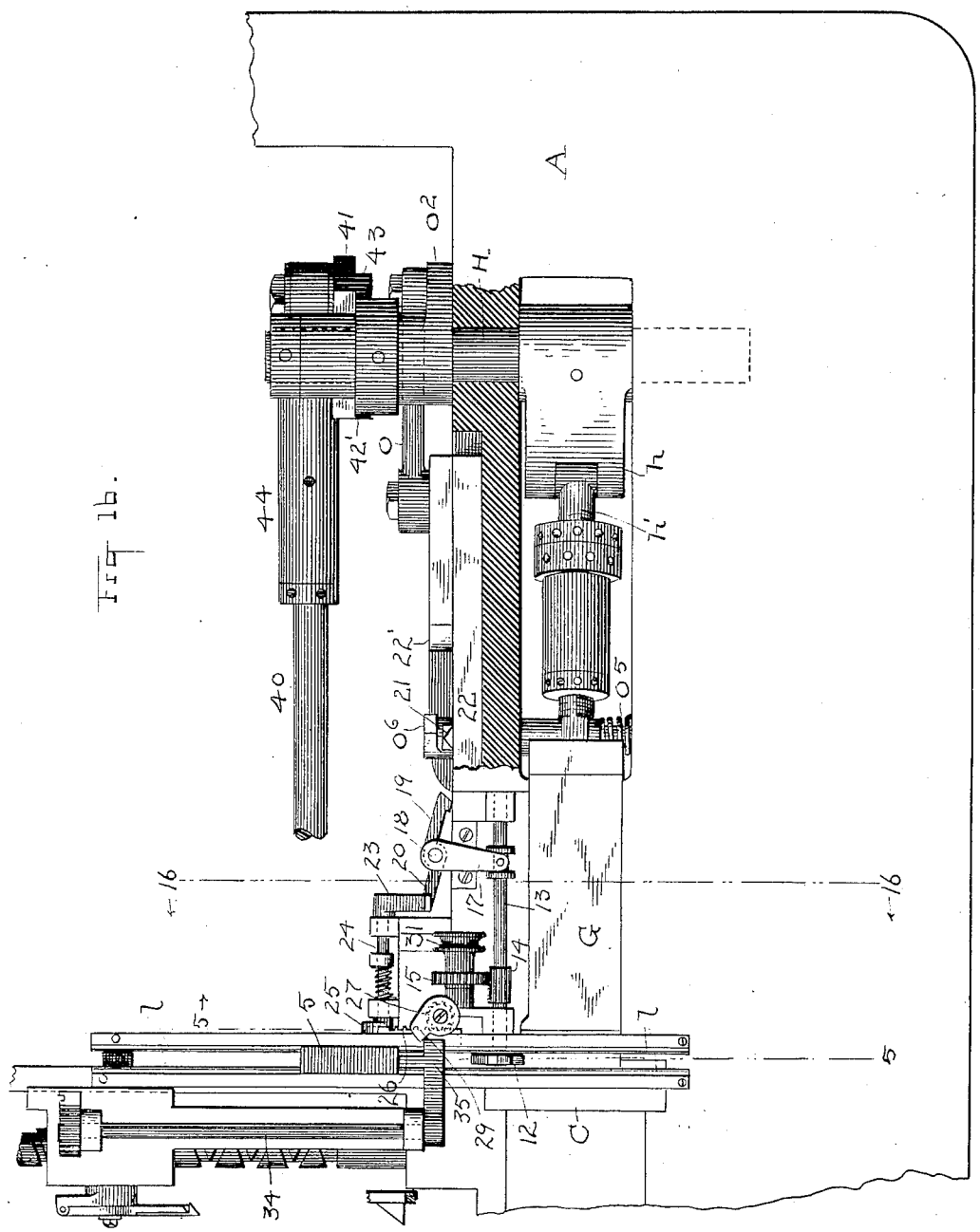
Figure 14:
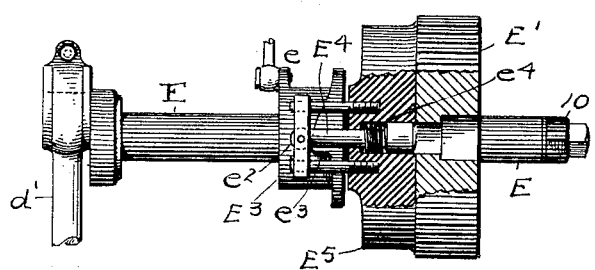
Figure 18:
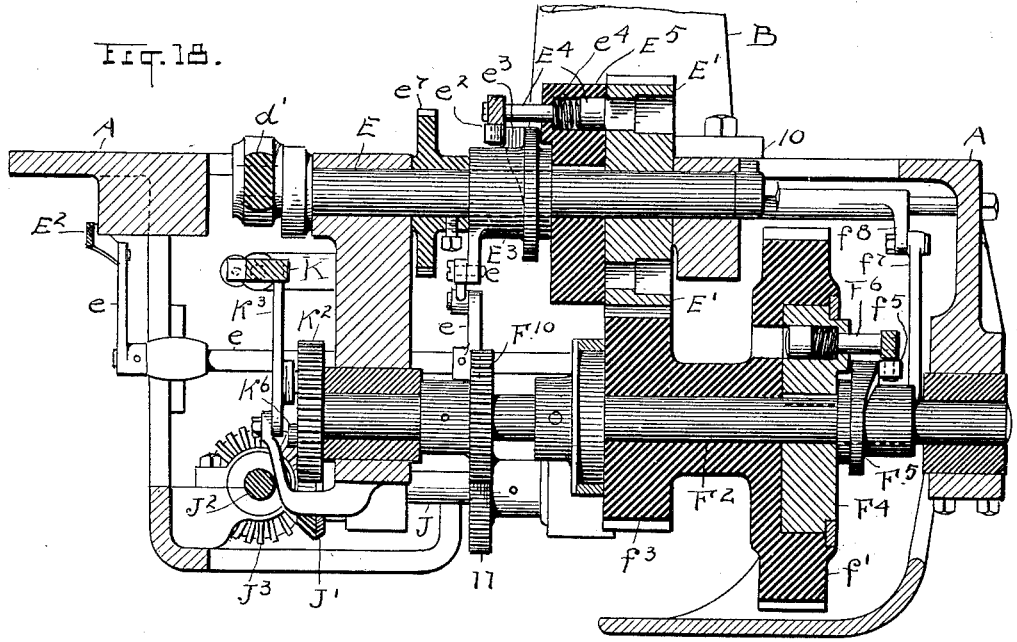

In the accompanying drawings, Figure 1 is a front elevation of the machine in its completeness, but necessarily on a greatly-reduced scale and with some of the smaller parts very obscurely outlined or possibly omitted. Fig. 2 is an end elevation looking in from the left of Fig. 1. Fig. 3 is a rear elevation on the same scale substantially as Figs. 1 and 2. Fig. 4 is a plan view from the base downward and with the upper mechanism removed. Fig. 5, Sheet 5, is a central sectional elevation of the base part of the machine on line 5 5, Figs. 9 and 16, which is the line upon which the matrices are fed to the machine. Fig. 6 is a perspective elevation of a matrix of the kind used in this machine and is an example of all that I use. Fig. 7 shows perspectives of both the hard-metal blank-bar, which forms the body of the type-bar and which is designed to be used over and over again, and also a strip of soft or flowing metal which in the operation is pressed upon the blank-bar and has the characters imprinted therein. Fig. 8 is a perspective view of a type-bar complete. Fig. 9 is a longitudinal sectional elevation of the machine on line 9 9, Figs. 2 and 4, and showing the normal or rest position of all the operating parts. Fig. 10 is a longitudinal sectional elevation on lines 9 9, Fig. 4, and corresponds in some particulars to Fig. 9, but shows the impression-plunger at its forward stroke with the lock-block in locking position and the space-adjusting mechanism having spread the space-bars. Fig. 11 corresponds in the main to Figs. 9 and 10 and is taken on line 9 9, Fig. 4, but shows the bar-holder down and the ejector at the limit of its forward movement and other parts in changed relation, as hereinafter described. Fig. 12 is a longitudinal sectional elevation on line 12 12, Fig. 4, looking forward and giving a back view of some of the parts shown in the next preceding figures and disclosing other parts not seen therein. Fig. 13 is a plan view showing sundry parts in horizontal section and disclosing particularly the matrix-locking mechanism in locking position, as occurs when the bar is to be printed. Fig. 14 is a cross-section of the lower part of the machine more particularly on line 14 14, Fig. 4. Fig. 15 is a horizontal sectional view on the line of the matrix locking and feeding devices. Fig. 16 is a somewhat similar view showing a plan of the locking devices out of action and the line-carrier traveling back with matrices and releasing the feed or star wheel to operating position in the matrix slot. Fig. 17 is an enlarged elevation in cross-section on line 17 17, Fig. 4. Fig. 18 is a cross-section on line 18 18, Fig. 4, showing particularly the compressing mechanism; and Fig. 19 is a plan view in section of a clutch for starting the main plunger and its mechanism and shown in section on a different line at the top of Fig. 18. Figs. 20, 21, 22, 23, and 24 are a series of views showing specially the spacing devices used in this machine.

A represents the bed or main frame of the machine, which in this instance is made, preferably, in a solid piece of casting and of suitable weight at all points to sustain all the needs of the machine.

B are the columns or supports at the respective ends or sides of the machine and serving to sustain the mechanism that comes above the base, and particularly distributing mechanism, but also the magazines for the matrices and the assembling-ways therefor, as seen in face view, Fig. 1.

This machine starts with the two elements 2 and 3 in Fig. 7, in which the blank 2 is the body of my type-bar 4, (seen complete in Fig. 8,) and 3 is a strip of suitable type-metal adapted to be forced onto the tongue of the blank and to have the characters formed in its edge in one and the same operation, and by a thrust which makes the action instantaneous. The body of the bar is preferably of steel, so as to be used over and over indefinitely, while the strip 3 may be of composite metal—something harder than lead—and is easily stripped off after being used and may be worked over for further use. In Fig 6 on the same sheet I show my new form of matrix 5, in the edge of which is formed in intaglio a character from which imprint is to be made in the type-bar. A line of these completes a bar, including the necessary spacers. The machine herein shown and described has to do with the production of a finished type-bar, as in Fig. 8, from the elements in Fig. 7 and the assembling and distribution of the matrices in Fig. 6 and the spacers in Figs. 20 to 24.

First of all the machine is provided with two hoppers 2' and 3' for the blank-bar 2 and blank-strip 3, respectively, which are automatically fed in their proper order over or through suitable chutes or channels, which will promptly deliver each to its place, suitable feed mechanisms being employed to facilitate the delivery of the blanks if they do not travel fast enough by gravity. Indications of such mechanism are seen in Figs. 1 and 9, and the same is fully shown, described, and claimed in a concurrent application by me bearing Serial No. 693,230, filed October 11, 1898. Having delivered said blanks in proper order, one of each on the flat support 6, they are in position and relation to be carried forward into the transverse slot in the blank-holder C, in which the slot is adapted to be filled or occupied fully by the blanks, so as to prevent any buckling or flowing of metal or the like when pressure is applied. The plunger D, which forces the blanks forward and at last unites them and produces the impression of the type thereon, has a tongue $d$ of the exact size of the blanks in cross-section, so as also to enter the slot after the blanks a slight distance—say as seen in Fig. 10—and has a strengthening-rib on its bottom running in a channel in the plate 6. The arm $d'$ has a ball-joint connection with plunger-head D and is operated by the rotating-shaft E, having an eccentric connection with said arm $d'$, so as to give the requisite back-and-forth play to the plunger. The further connections of shaft E to drive the same will be hereinafter explained. Other parts are also operated from this shaft, as will be seen, and power is applied thereto through the large band-wheel F', which also serves as a balance-wheel and is secured to power-shaft F, having gear connections $f$ and $f'$ with shaft $F^2$, Figs. 4 and 18. On shaft $F^2$ is a gear $f^3$, which meshes with gear E' on shaft E, and gears $f'$ and $f^3$ are cast in one piece and are free on shaft $F^2$ except when clutched therewith. Now to complete the operation incident to main plunger D and obtain a finished product it is necessary that there should be something commensurate to sustain the thrust on the other side, and to this end I employ a sliding abutting head G, actuated by a crank-arm $h$ on rock-shaft H and connecting-rod $h'$, which is adjustable as to length, so as to finely determine its best operating length, governed by the position head G should occupy. To this end rod $h'$ is sectional and connected by a turnbuckle to make its adjustments. An inlaid piece $g$ at the front of head G has a transverse rib to engage in corresponding notches in the edges of the matrices and assist in alining them, and the impression or matrix chamber, in which the matrices are assembled and locked and the impression is made, lies between the holder C for the blanks and the head G.

Returning now to the mechanism for operating main plunger D, Fig. 18, it will be seen that power is transmitted through shafts E and $F^2$ from the power-shaft F and to sets of gears free on their respective shafts to rotate thereon without turning the said shafts except as they become locked by their respective clutches. Thus gear E' is free on shaft E and only rotates with it when the operator moves lever $E^2$ for that purpose. From this lever there proceeds a line of connections marked $e$, Fig. 18, and extending to a cam-hub $E^3$, free on plunger-shaft E, and by which lever and connections the cam-sleeve is rotated just sufficiently to carry the roller $e^2$ over the shoulder $e^3$ of the cam. The roller $e^2$ is on the clutch-bolt $E^4$, spring-pressed and normally retired within the fixed clutch-wheel $E^5$, said bolt having suitable guide-pins, as is common. Hence when the operator by a quick movement of lever $E^2$ carries roller $e^2$ off its shoulder, Fig. 19, the spring $e^4$ throws bolt $E^4$ into position to engage gear E', and thus shaft E is rotated because said gear is in constant rotation. However, as soon as roller $e^2$ comes around again to the summit of the cam-shoulder the bolt $E^4$ is thereby withdrawn and shaft E stands still, awaiting another actuation from the operator through lever E'. This occurs every time he is ready to print or produce a type-bar and there is no movement until he is ready.

The instant a type-bar has been made it is ready to be discharged from the machine a complete article, and to effect this mechanism is employed in connections from intermediate shaft $F^2$. In this case a clutch mechanism substantially similar to that above described is employed. The gear $f'$ is in continual rotation, but shaft $F^2$ is not, so in order to turn said shaft when wanted a clutch-wheel $F^4$ is splined thereon and a cam-sleeve $F^5$ engages a roller $f^5$ on the bolt $f^6$, normally retired in wheel $F^4$. The said cam-sleeve $F^5$ is rotated through mechanism seen in Fig. 17, said sleeve having an arm connected by link $f^7$ with a double-armed trip $f^8$ and $f^9$, engaged by a trigger 10 on shaft E. The said trigger and associated mechanism is set and adjusted to rotate shaft $F^2$ one revolution immediately after the plunger D has done its work, so as to lower the blank-holder C to discharging position for the finished type-bar.

The successive steps in the foregoing mechanism are seen somewhat clearly in Figs. 9, 10, and 11. In Fig. 9 the holder C is up and the plunger retired normally. In Fig. 10 the holder is up and the plunger advanced to the finishing-point, practically, of a compression of the type-bar, and in another instant it will be retiring, leaving the head C and its finished bar free. Now the bar must be ejected, and for this purpose the holder C is lowered in its guides relatively to position, as seen in Fig. 11. The lowering occurs, primarily, through the last-above-described clutch mechanism and shaft $F^2$. Now from shaft $F^2$ power is transmitted to holder C through gear $F^{10}$, Fig. 18, meshing with gear 11 on shaft J. Bevel-gear J' meshes with gear $J^3$ on shaft $J^2$, Fig. 10, and a three-sided cam $J^4$ on this shaft, Fig. 14, working between transverse bearings $c\ c$ on the immediate extension or support of holder C raises and lowers said holder the right distances and at the right times. The raised and presumably rest position is seen in Fig. 14, as in Figs. 9 and 10, and the lowered position would be its opposite extreme. When the latter position is reached and the cam travels back to normal position, it allows the holder to remain down long enough to effect the dislodgment of the finished bar, and of course this occupies but a moment of time. To this end I employ what I term an "ejector" K, which is of a length and shape suitable to follow the bar through its slot in the holder C and deliver the bar to the chute $k$, Fig. 11. On its way to the chute the bar passes between a set of shavers or trunnions $k'$, which remove any possible ragged edges or excess of flowing metal at any point on the bar as the result of its compression and imprinting by the assembled matrices. In any event there can be but little such overflow, as the blanks are in a snug place and completely fill all parts thereof, while the matrices are gathered and pressed together so firmly that they for the time become practically as one piece. How this is done will be explained farther along. However, anything excessive will be removed by the knives $k'$, and all the bars that pass here are absolutely clean and even over both surfaces and at their ends. To actuate the ejector K, two separate lines of mechanism are employed, one to carry it forward and the other to carry it back. The forward movement proceeds from shaft $F^2$, carrying a gear $k^2$, meshing with gear $k^4$, supported on a stud on the main frame. At the side of this latter gear and rotated thereby is the toothed segment $k^5$, which is adapted at every rotation to engage the rack-teeth on the ejector K and carry it, as in Fig. 11. Now to return the ejector I employ an arm $k^3$, which is pivotally supported at its lower end, and at its upper end engages the ejector K. A roller $k^6$ on gear $k^2$ is arranged to strike a lateral projection on said lever and throw it back just far enough to withdraw the ejector, as in Fig. 10. Manifestly this is but one of a number of ways in which the intermittent reciprocation of the ejector can be effected, and the same may be said of sundry other detailed operations in this machine, some of which have already been described. It will therefore be understood that I do not confine the invention to the details here shown, even though others may not be suggested nor described, but that the invention is as broad in all parts and in every respect as the claims. Having discharged the finished type-bar into chute $k$, it travels by gravity to the galley $k^8$, Fig. 1, arranged to receive it, from which it goes directly to the composition-table.

We come now to the handling of the matrices as they are assembled and gather in the composition and compressing chamber, constituted chiefly by holder C and bulkhead G. An assembled line of these is shown in Figs. 9 and 13, for example. In the composition of a line it will be understood that the spaces or spacers shown on sheet 16 and hereinafter described are assembled with the matrices 5 and are understood to be present in the description which refers to the assembled matrices. Having the matrices delivered, as in Fig. 9, their T-shaped heads engage in the channeled tracks $l$. (Seen in cross-section, Fig. 9, and in plan and elevation, Figs. 5 and 15.) These tracks serve as supports and slides for the matrices. One matrix is delivered at a time, and each follows the other in rapid succession through the mouth of the assembling-plate L at the rear of the composition-column, as seen in Fig. 5, and each matrix as it arrives drops in front of star-wheel 12 and is instantly pressed forward thereby out of the way for the next matrix. The wheel 12 is supposed to travel at such speed that it prevents possible piling up of matrices upon each other, which cannot, in fact, occur, however rapidly the operator calls them in. Said wheel 12 is on shaft 13, Fig. 15, longitudinally adjustable in its bearings and has a lantern-gear 14, meshing with gear 15 on shaft 16, whereby the shaft 13 is rotated. The longitudinal adjustment is to get the wheel out of the way of the line of used matrices, so that they can be carried back bodily on the tracks $l$ out of the way and be distributed. At the right time wheel 12 is carried back again to operation, and this to-and-fro adjustment is effected by means of the arm 17 on shaft 18, which in turn has two opposite arms 19 and 20 rigid therewith, the arm 19 serving to retract or withdraw wheel 12 when engaged and raised by lug 21 on sliding bar 22, and being thus raised enables arm 20 to be caught by stop 23. This stop is vibrated on its spring-controlled shaft 24 through upright arm 25, Fig. 12, engaged by sliding rack-bar 26, in mesh with gear 27 on shaft 28, carrying projections 29, through which said shaft is rotated to raise arm 23 and release arm 20, while the spring on shaft 24 restores all the associated parts from 23 to 29 to normal position. A spring 30, Fig. 12, serves to throw star-wheel shaft 13 back to working position when said shaft is released by arms 23, Fig. 15. The arm 35, designed to carry the used matrices back on their tracks, is seen in its initial position, Fig. 15, and in its advanced position, Fig. 16, where it is in contact with projection 29, where also the arm 20 is released and star-wheel 12 is back ready for work. All these actions and movements are of course timed to take place when and as they are needed, so as to be automatic in all points and not to occasion any waiting anywhere. Shaft 13, carrying the star-wheel, is rotated by band 32, running over pulley 31 above and pulley 33 beneath, the latter pulley getting power from the power source, as will hereinafter appear. Arm 35 for moving a line of matrices and spacers away from the composing-chamber is rigidly fixed on rock-shaft 34, Figs. 15 and 16, which shaft is rotatably supported on a carriage adapted to travel back and forth on the reversely-threaded screw below, and fully set forth and claimed in my concurrent application, Serial No. 727,150. It may be noted here, however, that in its return trip the arm 35 stands erect and is rotated down to horizontal position, as in Fig. 15, when the return movement is completed and a line is ready to be moved away.

Referring to Fig. 13, an alining-bolt $g^4$ is shown as attached to plunger G and adapted to enter a socket in the type-bar holder C, which serves to bring said holder into the same position uniformly throughout all its repeated operations. In the same figure also is shown what is here termed the "locking-ram" $g'$ for the line of matrices on their otherwise-open side. This ram or lock is pivoted at its base on the frame of the machine and has a lug $g^2$ at its pivot adapted to be engaged by the roller on the bolt 22 forward of said lug, so that when the bolt is retracted it will lift the lock $g'$, as seen in dotted lines, and let the bank of matrices pass out, and when forward, as in full lines, will lock the matrices firmly in place, the wheel $g^3$ in this case running forward and bearing hard against the lock, as seen in Fig. 13.

Referring now to the so-called "justifying mechanism" designed to adjust the spaces shown on sheet 16, it will be noticed on said sheet that the said spacers are designed to be tightened by endwise movement or pressure from below. The lower ends of the spacers are designed to be on a lower plane than the corresponding ends of the matrices, so that when said ends are pressed upward they will spread the spacers bodily and cause them to tighten up and justify the line. The immediate member to do this is the arm N, Figs. 10 and 11, and having a serrated head $n$, Fig. 5, of a length somewhat greater than a line of matrices, so as to respond to any spacer that may be called in, even at the end of a line. In Fig. 11 the arm N is down, as normally, and in Fig. 10 it is up in action. It is pivoted at $n'$, and its longer end has link connection $n^2$ with an arm $n^3$ on a spring-pressed head $n^4$ in the tubular hanger $n^5$. The tension of spring $n^6$ is downward, bringing arm N to acting position, as in Fig. 10. Against this tension is the pressure exerted through lever O, pivoted between its ends, and at its inner end engaging a pin or lug $n^7$ on lever N and at its outer end arranged to be depressed by lug $o'$ on slide 22. A link $o$ connects said slide with an arm $o^2$ on rock-shaft H, the extreme operating positions of which are seen in Figs. 10 and 11. A spring-pressed hook $n^8$ in the frame is in swinging position to be engaged by hook $n^9$ on lever N when the long end of said lever is raised by engagement with lug $n^7$ and causes its hook $n^9$ to catch on the hook $n^8$. This hook connection holds the head $n$ of lever N down, as in Fig. 11, and leaves the way free for the spacers to be assembled with the matrices. Then as the said hooks are disengaged spring $n^6$ comes into action and throws the head $n$ upward with such force as to be equivalent to a blow, bringing every spacer to locking position and justifying the assembled line. The catch $n^8$ is on a transverse shaft $o^4$ with a spring $o^5$, Fig. 15, and a short projection $o^6$ on this shaft is engaged by the end of the part 22' on sliding bolt 22, and thus when said bolt moves forward to do the several things it is designed to do, including the locking in of the matrices, the shaft $o^4$ is rotated and the hook $n^8$ is released. This enables the space-justifying head $n$ to be thrown up, as before described, at the same time that the matrices are being locked laterally, and thus the whole work is done practically at the same time and instantly.

Power is communicated to shaft H, which actuates the plunger G and the slide-bolt 22, through the line of mechanism clearly traceable in Figs. 12 and 13. Thus in Fig. 12 we see a gear-wheel R supported on a stud $r$, meshing with wheel $e^7$ on revolving shaft E and designed to perform a complete rotation. Supported on the side of this gear is the jointed connecting-rod or mechanism 40, running back and engaging with a toggle-arm 41 on shaft H. A rocking bearing 42, having its pivot shown in cross-section, serves to accommodate itself to all the needs of the link connection 40, and the arm 41 has free play on shaft H between the projections 42' and 43, rigid with said shaft. This affords such very brief loss of time in the rotation of shaft H and its actuation of the parts dependent thereon as may be necessary to allow other parts to first do their work. A turnbuckle 44 in the connecting-rod or pitman 40 serves to make fine adjustments as to length.

Referring now to Sheet 16, we have several figures illustrating the spaces or spacers, which are fully shown, described, and claimed in my application, Serial No. 601,051, filed July 30, 1896. Each spacer S is constituted of two overlapping parts $s$ and $s'$, notched near their center for the interposition of a series of toggle links or plates $s^2$. The parts $s$ and $s'$ are loosely secured together, so that the lower part can slide upward in relation to the upper part and in this operation turn the links $s^2$ more or less sidewise, and thus spread the spacer in the same proportion. The spacer-lifting head $n$ on lever N strikes the lower section $s'$ and raises it, and thus causes the spreading of the spacer and justifying of the assembled line into which the spacers have been gathered. When released, the parts at once resume their closed relation by gravity and spring tension, as in Fig. 21.

The chute $k$ for the finished type-bar and the galley $k^8$ are seen especially in Figs. 1 and 14. In the latter figure I show mechanism for moving the bars forward on the galley as they are deposited, said mechanism consisting in this instance of a rotatable shaft $k^9$, with a projection $k^{10}$ on its head adapted to be engaged by the cam-moved frame, and thus swing or vibrate the bar-mover $h^{12}$. A spring on shaft $k^9$ carries it back to starting position, while the positive actuation moves all the accumulated bars forward out of the way of the next one.

The matrix assembling and distributing mechanism as well as other parts not fully shown or described herein are subjects-matter of the applications hereinbefore specifically named or of my pending applications, Serial Nos. 727,150 and 727,151, filed August 4, 1899.

The plunger 50, Figs. 9 and 10, is designed to liberate the matrices from the type-bar after an imprint, the tendency being for the matrices to stick to the bar. A plate 51 is pivoted in the face of the bar-holder the width thereof and is spring-pressed below its pivot to keep it back in place. An opening is formed through the bar-holder below the transverse slot for the bar, through which plunger 50 enters, and this is done the instant that plunger-head G has been withdrawn far enough to allow a release of the matrices in this way. At its other end plunger 50 is suspended by a link 52, shaped substantially as shown and arranged to be engaged by cam 53 on the main plunger-shaft E, and this cam is so positioned that it actuates the link 52 and plunger 50 at just the right time and before the bar-holder starts on its descent. All these changes are momentary in duration and in action are more like a single movement than a succession of movements. A spring 54, bearing against link 52, carries the plunger 50 back instantly upon its release by cam 53.

What I claim as new, and desire to secure by Letters Patent, is—

1. In a type-bar machine, a vertically-movable bar-holder and a horizontally-movable head opposite the same, in combination with a rotatable shaft, and connections between shaft and head to move the head back and forth, substantially as described.

2. The type-bar holder and the compression-plunger, the sliding head opposite the plunger to receive the thrust thereof, a rotatable shaft, and adjustable connections between said head and shaft, substantially as described.

3. The type-bar holder having a depending portion and adapted to slide up and down, a shaft and an eccentric or cam on said shaft arranged to engage said depending portion to lower and raise said holder, substantially as described.

4. The composing-chamber for the matrices, and grooved parts to suspend the matrices from their upper ends, and a rotatable member to press the matrices forward in line as they assemble, substantially as described.

5. The matrix-chamber and the grooved tracks at its top to carry the matrices, and a revolving wheel with a projection to press against one side of a matrix and carry it out of the way of the next succeeding matrix, substantially as described.

6. The matrix-assembling chamber constructed along its top to suspend the matrices from their heads, in combination with a toothed wheel revolving at the front of said chamber to feed the matrices forward as they descend, and means to turn said wheel aside out of its working position to allow the matrices to pass out, substantially as described.

7. The matrix-composing chamber and the means to suspend the matrices in line therein, a rotatable device to press the matrices forward as assembled and a shaft carrying said device and arranged to slide, substantially as described.

8. The composing-chamber and the tracks for the matrices, a device between said tracks to press the matrices forward in line as they are assembled, and a shaft and mechanism to move said device out of the way of the matrices for distribution, substantially as described.

9. The composing-chamber, the star-wheel to press the matrices forward as assembled, a shaft carrying said wheel and slidable axially to get the wheel out of the way of the matrices for distribution, and means to carry the matrices past said wheel, substantially as described.

10. The composing-chamber and the tracks at the top thereof for the matrices, and means to carry a line of matrices bodily along on said tracks from the composition-chamber for distribution, the same comprising a sliding rod and rotatable arm, substantially as described.

11. The supports for the assembled matrices having a space between them to move a line of matrices along for distribution, and means to engage said matrices constructed to slide and rotate and consisting of a rod and an arm thereon, substantially as described.

12. The machine having a composing-chamber, a wheel to press the matrices forward in said chamber, as they are delivered, mechanism to move said wheel into and out of working position, and means to remove a line of type out of said chamber past said wheel when temporarily withdrawn, substantially as described.

13. The composing-chamber and the wheel to feed the matrices forward, a shaft carrying the wheel and a bell-crank engaging said shaft and gear mechanism to rotate it, substantially as described.

14. The bar-holder having a transverse slot for the bar, a plunger to enter said slot behind the bar, and a device beneath said plunger to strike the matrices from the type-bar, substantially as described.

15. The composing-chamber, and an arm having a serrated face arranged beneath said chamber in position to strike the depending portions of the spacers and force them upward and means to actuate the arm, substantially as described.

16. The composing-chamber, and the means for locking a line of matrices and spacers therein, in combination with a pivoted member having a serrated head beneath the spacers and means to cause said head to strike the spaces with a blow, substantially as described.

17. The composing-chamber, and the line of matrices and spacers therein, and means to lock them together, said spacers having depending portions, in combination with a pivoted arm having a serrated face to engage the ends of the spacers, and spring-actuated mechanism to force said arm into action, substantially as described.

18. The composing-chamber, and the pivoted arm to raise the spacers into locking position, in combination with means to tilt said arm and hold it out of engaging position, and releasing mechanism for the arm and a spring to give it force when released, substantially as described.

19. The bar-holder and the abutting head opposite the same forming a composing-chamber between them, in combination with a pivoted member to engage against one side of an assembled line of matrices and press them together, and mechanism to press against said member, substantially as described.

20. The composing-chamber for a line of matrices, a pivoted arm to bear against the inner side of said line, and a locking-bolt to bear against said arm, substantially as described.

21. The composing-chamber and the pivoted arm at the inner open edge, a sliding member to bear against said arm, means to withdraw said sliding member and means to swing said arm out of working position, substantially as described.

22. The composing-chamber and the pivoted arm having a lug near its pivot, and a sliding lock provided with a roller bearing on said arm and arranged to engage the said lug to withdraw the arm, substantially as described.

23. The bar-holder, a carrying-frame therefor, and the means to raise and lower the same, in combination with the galley for the finished matrices and the device to feed the matrices forward in the galley operatively connected with the means to raise and lower the bar-holder, substantially as described.

24. The bar-holder and the abutting head opposite the same, and a bolt actuated by said head and engaging in the bar-holder to bring it always to the same working position, substantially as described.

25. The abutting head opposite the bar-holder and a shaft and connecting-rod to operate said head, and mechanism for rocking said shaft constructed to afford lost motion, substantially as described.

26. The abutting head, the rock-shaft and the connections therewith to operate said head, a connecting-rod sleeved on said shaft and stops rigid with the shaft between which said rod is free to turn, substantially as described.

27. The abutting head and its shaft, and connections to rock the shaft and actuate the head, in combination with an arm to close one end of the composing-chamber, a slide to actuate said arm and connections thence to the aforesaid shaft whereby the matrices are locked on the side and end at the same time, substantially as described.

28. The main plunger and the bar-holder and the shaft and connections to actuate the said plunger, in combination with a controlling-lever, a cam-clutch to engage said shaft temporarily and a line of mechanism connecting said clutch and lever comprising a rock-shaft, substantially as described.

29. The means for taking an impression from an assembled line of matrices comprising the bar-holder, the main plunger and the power connections therefor, and the abutting head, in combination with mechanism to set the main plunger in motion consisting of a rock-shaft and the controlling-lever connected therewith, and a clutch operatively connected with said rock-shaft, substantially as described.

30. The bar-holder and the main plunger, the abutting head and the shaft and pitman to operate the same, in combination with the centering-bolt between the abutting head and bar-holder and the lock for the matrices at the inner end of the line, substantially as described.

31. The main plunger and its shaft, a gear-wheel sleeved on said shaft and a clutch-wheel fixed on said shaft, clutch mechanism to lock said wheels together and turn the shaft, and a cam to throw said mechanism out of locking engagement on a complete rotation of the shaft, substantially as described.

32. The main plunger-shaft and a gear free thereon, a secondary shaft and a free gear thereon meshing with the gear on the plunger-shaft, and separate clutch mechanism for each of said gears, in combination with the main plunger, the controlling-lever and the line of mechanism connecting said lever operatively with the clutch on the plunger-shaft, substantially as described.

33. The main plunger-shaft and a cam rotated thereby, a releasing-plunger for the matrices and a pivoted member connected therewith and engaged by said cam, substantially as described.

34. The machine having a matrix composing-chamber, means to support matrices therein, and means for striking the matrices from a finished bar, substantially as described.

35. The plunger for striking the matrices from the type-bar, the bar-holder, and a pivoted spring-pressed plate in said holder engaged by said plunger, substantially as described.

36. The bar-holder and the spring-pressed plate in its face, in combination with the releasing-plunger and a pivot-link therefor at its outer end, and a device to engage said link and press the plunger inward, substantially as described.

37. In a type-bar machine using cold blanks to form a bar, a holder for the blanks, in combination with a plunger to engage said blanks in the holder, an abutting head opposite the plunger to take the thrust, and operatively-connected power mechanism to cause both plunger and head to move simultaneously, substantially as described.

38. In a type-bar machine, a holder adapted to receive a set of blanks to form a finished type-bar, a plunger to press against the blanks in the holder, an abutting head on the opposite side of the holder to take the thrust, power-controlled mechanism actuating said plunger and head, and a single lever to throw said operating parts into action, substantially as described.

39. In a type-bar machine adapted to form a finished bar from blanks by a cold process, a blank-holder and a plunger and head, respectively, on opposite sides of the holder, separate shafts controlling said plunger and head and power connections between said shafts, and mechanism for automatically returning both plunger and head to starting position, substantially as described.

Witness my hand to the foregoing specification this 2d day of February, 1899.

ROSWELL H. ST. JOHN.

Witnesses:
H. T. FISHER,
R. B. MOSER.